United States Patent [19]

Levine

[11] 4,386,346
[45] May 31, 1983

[54] CURSOR CONTROLLER

[75] Inventor: James L. Levine, Yorktown Heights, N.Y.

[73] Assignee: International Business Machines Corporation, Armonk, N.Y.

[21] Appl. No.: 248,667

[22] Filed: Mar. 27, 1981

[51] Int. Cl.³ .............................................. G09G 1/00
[52] U.S. Cl. .................................... 340/709; 340/721; 340/723
[58] Field of Search ............... 340/709, 722, 721, 700, 340/710, 707, 723, 724

[56] References Cited

U.S. PATENT DOCUMENTS

| | | | |
|---|---|---|---|
| 3,422,418 | 1/1969 | Simoneau | 340/722 |
| 3,541,521 | 11/1970 | Koster et al. | 340/172.5 |
| 3,911,419 | 10/1975 | Bates et al. | 340/709 |
| 3,974,493 | 8/1976 | de Caviagnac et al. | 340/172.5 |
| 4,020,391 | 4/1977 | Baxter | 340/709 |
| 4,080,515 | 3/1978 | Anderson | . |
| 4,101,879 | 7/1978 | Kawaji et al. | 340/154 |
| 4,181,952 | 1/1980 | Casey et al. | . |
| 4,313,113 | 1/1982 | Thornburg | 340/709 |

Primary Examiner—Marshall M. Curtis
Attorney, Agent, or Firm—Alvin J. Riddles

[57] ABSTRACT

A controller is provided for manually actuated movement of a cursor in an interactive display wherein overshoot in the positioning of the cursor when rapid movement is involved is compensated employing a factor involving the user's reaction time and the motion rate of the cursor.

6 Claims, 2 Drawing Figures

CURSOR CONTROLLER

DESCRIPTION

1. Technical Field

The technical field of the invention is that of controlled movement of an index member or cursor on the face of a display. A display when used as a communication medium for a data processor is provided with a moveable indicator called a cursor that is actuated by an operator using the controls for the display. The term cursor was also used as a name for the light pen or stylus used in displays where information is entered by touching a point on the surface of the display. This invention relates only to the type of cursor where the controls of the display are employed.

The cursor defines the point of attention of the person working with the display and is moved from place to place in the display area in interactive communication between the display and an operator. Psychomotor limitations on ability to precisely move the cursor from one part of the display to another thus become more critical. The apparatus generally provided for movement of the cursor is single space which takes a long time for significant distance or either a fixed or exponential movement rate which tend to overshoot and require separate operations for correction.

2. Background Art

The cursor control problem has received some attention in the prior art.

Circuitry has been provided in connection with cathode ray tubes to control the position of a cursor by dividing the screen into particular areas and setting up errors in a register. This is illustrated in U.S. Pat. No. 4,101,879. A method of providing a scan control by a prolonged depression of a key is illustrated in U.S. Pat. No. 4,020,391. In U.S. Pat. No. 3,541,521 there is set forth a control by a handle of the acceleration of a cursor in which the cursor moves faster the more rapid the handle is moved.

Thus far in the art, however, an approach has not been developed wherein a cursor can be rapidly moved from one position of a display to another and then stopped at a precise position without some form of manual correction being required.

DISCLOSURE OF THE INVENTION

The invention is a cursor controller for a display in which in a psychomotor operation such as the depression of a key, the display apparatus will move a cursor from one portion of the viewing area to another and when a selected location is reached, in accordance with the invention the controller provides a correction compensation signal to precisely position the cursor. The signal is a function of the speed with which the cursor is moving and the reaction time of the operator and operates to correct for overshoot and move the final location of the cursor to the desired position. As the cursor moves on the display the invention provides a correction factor for errors in the operator's position estimate.

Figure 1:
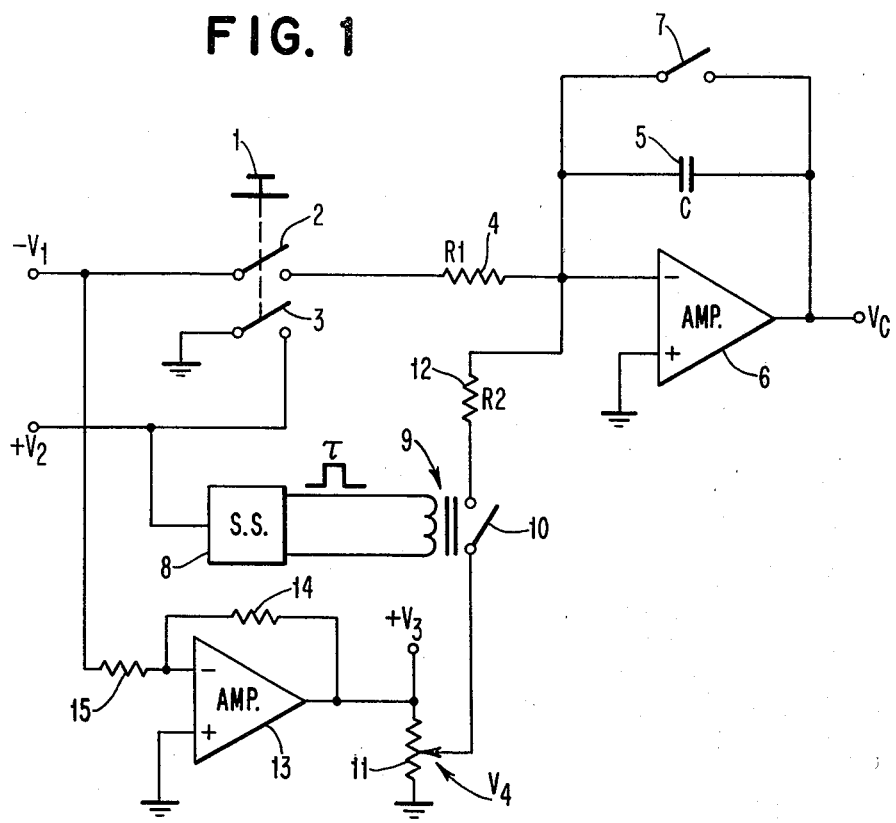
FIG. 1 is a functional circuit illustration of the cursor controller of the invention.
Figure 2:
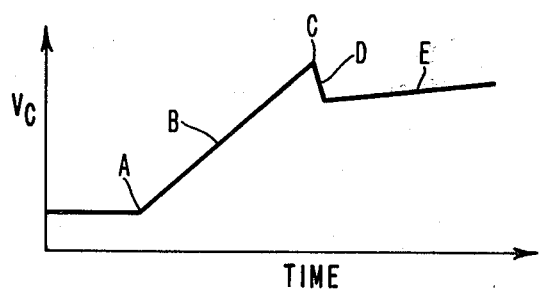
FIG. 2 is a cursor position control signal generated by FIG. 1.

The principles of the invention are illustrated functionally in the circuit of FIG. 1 for generating the position signal of FIG. 2.

While the preferred embodiment with current technology is that of an integrated microprocessor, for purposes of functional illustration the circuit of FIG. 1 is provided. In FIG. 1 the functions that would be embodied in the microprocessor to generate a cursor position in digital form in a preferred embodiment are shown generating the position signal of FIG. 2, in analog form. The function being performed by the illustrative circuit of FIG. 1 is to provide a cursor positioning signal such as a voltage magnitude that would position the cursor at a point along the distance of travel or survey of the display and a correcting signal which compensates for overshoot. The signal is shown in FIG. 2. It will be apparent to one skilled in the art that a signal such as that shown in FIG. 2 will be duplicated for each axis involved in the display. For example, on a standard two-dimensional cathode ray type display there would probably be both an x and a y signal of the type shown in FIG. 2 to position the cursor.

Referring to FIG. 1, the overall function performed is to provide a steadily rising drive voltage to move the cursor to a position and simultaneously therewith to actuate a means that will set up an overshoot control signal determined by how fast the cursor is moving and the operator's reaction time, so that when the operator signals to stop the cursor such as by releasing the cursor movement key, the overshoot control signal is applied to correctly position the cursor. The illustrative functional circuit of FIG. 1 produces as an output the voltage signal as shown in FIG. 2 wherein at a point A a progressively increasing voltage appears that moves the cursor through region B for as long as the operator indicates desire for movement. At point C, when the operator signals termination of cursor movement an overshoot compensation signal D is provided which brings the cursor positioning voltage E to corrected level.

Referring to FIG. 1, in the analog illustration of the principles of the invention a psychomotor responsive member such as a button 1 operates to close two switches, 2 and 3. Switch 2 connects a negative voltage $-V_1$ to an integrating circuit made up of a resistance $R_1$ labelled 4 and capacitance C labelled 5 in series connected across an operational amplifier 6. A switch 7 is provided to zero the control voltage when desired. One side of the operational amplifier 6 is connected to reference or ground. Thus, in response to an operator depression of the cursor movement button 1, the output voltage $V_c$ will be a linear ramp signal illustrated by region B of FIG. 2 that is determined by equation 1.

$$V_c = \left(\frac{V_1}{R1C}\right) t \qquad \text{Equation 1}$$

where t is the time of depression of the cursor movement button 1. The movement of the cursor is stopped by release of the key 1.

In accordance with the invention a cursor controller correction signal has been developed as a result of switch 3 being closed simultaneously with depression of push button 1. This operates to connect to ground a positive (+) voltage $V_2$ during the duration of operation of movement of the cursor. When the switch 3 is opened as the key 1 is released, a single shot multivibrator 8 is triggered generating a pulse of duration $t_1$ which operates to actuate a relay 9 and close switch 10. Through the points of switch 10 there is connected a variable potentiometer 11 and a resistor $R_2$ labelled 12 to the input of the operational amplifier 6. The variable potentiometer 11 provides a variable positive voltage labelled $V_4$ between $+V_3$ and ground through $R_2$ labelled 12, in the opposite direction to the voltage applied to the operational amplifier at the point between resistor $R_1$ labelled 4 and capacitor 5. $V_3$ is made proportional to $V_1$ but of the opposite polarity, by the inverting amplifier 13, the constant of proportionality being the ratio of resistor 14 to resistor 15.

Referring to FIG. 2, this opposite voltage operates to provide a correction signal labelled region D to the output voltage at point c so that when the cursor movement button 1 is released, the correction signal is in accordance with the relationship of equation 2.

$$\Delta V_c = -\left(\frac{V_4 t_1}{R_2 C}\right) \quad \text{Equation 2}$$

If a user has reaction time, $t_r$, then the cursor voltage will overshoot by the amount given in equation 3.

$$\Delta V_e = \left(\frac{V_1 t_r}{R_1 C}\right) \quad \text{Equation 3}$$

In accordance with the invention a correction is produced by making $\Delta V_c$ equal to $\Delta V_e$ as set forth in Equation 4.

$$V_4 = \left(\frac{V_1 R_2 t_r}{R_1 t_1}\right) \quad \text{Equation 4}$$

Thus, when the button 1 closes switches 2 and 3, the cursor position is controlled by the ramp voltage and the release of switch 3 produces the correction signal to subtract from the ramp value. Thus in FIG. 2, the cursor positioning signal voltage $V_c$ after moving through region B to point C will be ramped down region D by the amount $\Delta V_c$ set forth in equation 2 and this signal will move the cursor in the reverse direction to correct for the user reaction time. It should be noted that both the correction voltage and the cursor rate are proportional to the voltage $V_1$. Therefore, the correction will automatically increase if the cursor speed is increased by raising $V_1$.

Thus, in accordance with the invention, the problem of overshoot receives automatic compensation reflecting both the speed the cursor is moving and the reaction time of the operator. The correction is even more essential if the cursor speed is arranged to increase in time. Display apparatus wherein cursors have long distances to travel may be built this way. When it is desired to build acceleration into the positioning of the cursor a second serial integrating circuit is provided between the output of the operational amplifier and the output terminal. When this is done, the ramp voltage in the region B in FIG. 2 will be quadratic. The correction circuit would use the instantaneous rate voltage at the input to the second stage to develop the correction voltage.

The correction provided in accordance with the invention will be a complex function of cursor speed, and the acceleration factors if present, as well as the length of displacement. In operation, experienced users generally attempt to compensate for their own reaction times and this compensation is a function of several variables that will be different for each user. In accordance with the invention the user dependent reaction time and the time increment of cursor motion are combined into a single correction signal. Initially user reaction time adjustment is generally set at an average value and then incremented or decremented with experience with the individual user. The setting would be by adjustment of the potentiometer 11 for the functional illustration of FIG. 1.

Best Mode of Carrying Out the Invention

The preferred embodiment would be that of a microprocessor wherein the elements of the invention functionally illustrated in the sample circuit of FIG. 1 are employed digitally in a single integrated circuit substrate. Referring to FIG. 1 for the functions, the cursor location would be represented by a digital number stored in a register. There would be two tables of numbers stored in the microprocessor memory and accessed sequentially during cursor movement. The first table would represent a series of time-delays between cursor movements. For an accelerating cursor, these numbers would decrease according to the desired acceleration function. The second table would represent the correction to be applied to compensate for user reaction time. These numbers would be initially set according to an average user reaction time, and would be adjusted with use so that the specific user reaction time would be compensated.

The operation would be as follows. When the cursor movement key such as 1 of FIG. 1 is depressed, the microprocessor preferred embodiment receives a signal to increment or decrement the cursor position. It will be understood by one skilled in the art that although the descriptions involve incrementing, the operation of decrementing would merely be the opposite.

Under such conditions, the key depression would generate an interrupt signal, and upon receipt the cursor would be moved one unit. Simultaneously, the first time-delay value would be loaded into a suitable register and decremented at regular intervals until it reached zero. At this time, the cursor would be moved another unit and the next sequential time-delay value loaded. This process would continue until the key is released. At this time, all forward motion would be disabled. In accordance with the invention, the cursor would then be moved back a number of positions based on the final rate of movement and the user's reaction time as set forth in equation 3. This is accomplished by selecting the corresponding number in the correction table and subtracting it from the cursor location register.

In accordance with the invention, what has been described is a cursor positioning control wherein response errors from a psychomotor operation in positioning an indicator or cursor is compensated by a correction means that is based on both the rate of movement and the user reaction time.

Having thus described my invention, what I claim as new and desire to secure by Letters Patent is:

1. In a manually controllable device of the type wherein the position of an element proceeds at a rate in response to a first operator signal and the operation is terminated in response to a subsequent second operator signal, the improvement for providing an operator reaction compensated end point comprising:
  means for establishing a signal responsive to said rate;
  means for establishing a signal indicative of operator reaction time;
  means for producing an end point compensation adjustment signal based on the product of said operator reaction time signal and said rate signal; and
  means for establishing an end point position by applying said end point compensation adjustment signal negatively to the end point at the time of said second operator signal.

2. The device of claim 1 wherein said each signal is provided from an analog circuit.

3. The device of claim 1 wherein said rate responsive signal is derived from incremental steps through a first table in the memory of a microprocessor, each entry of said first table containing a time delay between movements of said element and said operator reaction time signal is derived incremental steps through a second table, each entry of said second table being a continuously corrected user reaction time.

4. In a display terminal of the type where depression of a key by an operator controls the speed and distance of cursor travel on a display, the improvement comprising:
  means for establishing a cursor motion rate;
  means for establishing operator reaction time; and
  means for negatively applying a backspacing signal to the cursor position for a number of spaces after release of said key determined by the expression:

$$\frac{\text{operator reaction time}}{\text{cursor motion time increment.}}$$

5. The terminal of claim 4 wherein said improvement is applied to each axis of the display.

6. The terminal of claim 5 wherein said display is a cathode ray tube.

* * * * *